United States Patent Office 3,580,713
Patented May 25, 1971

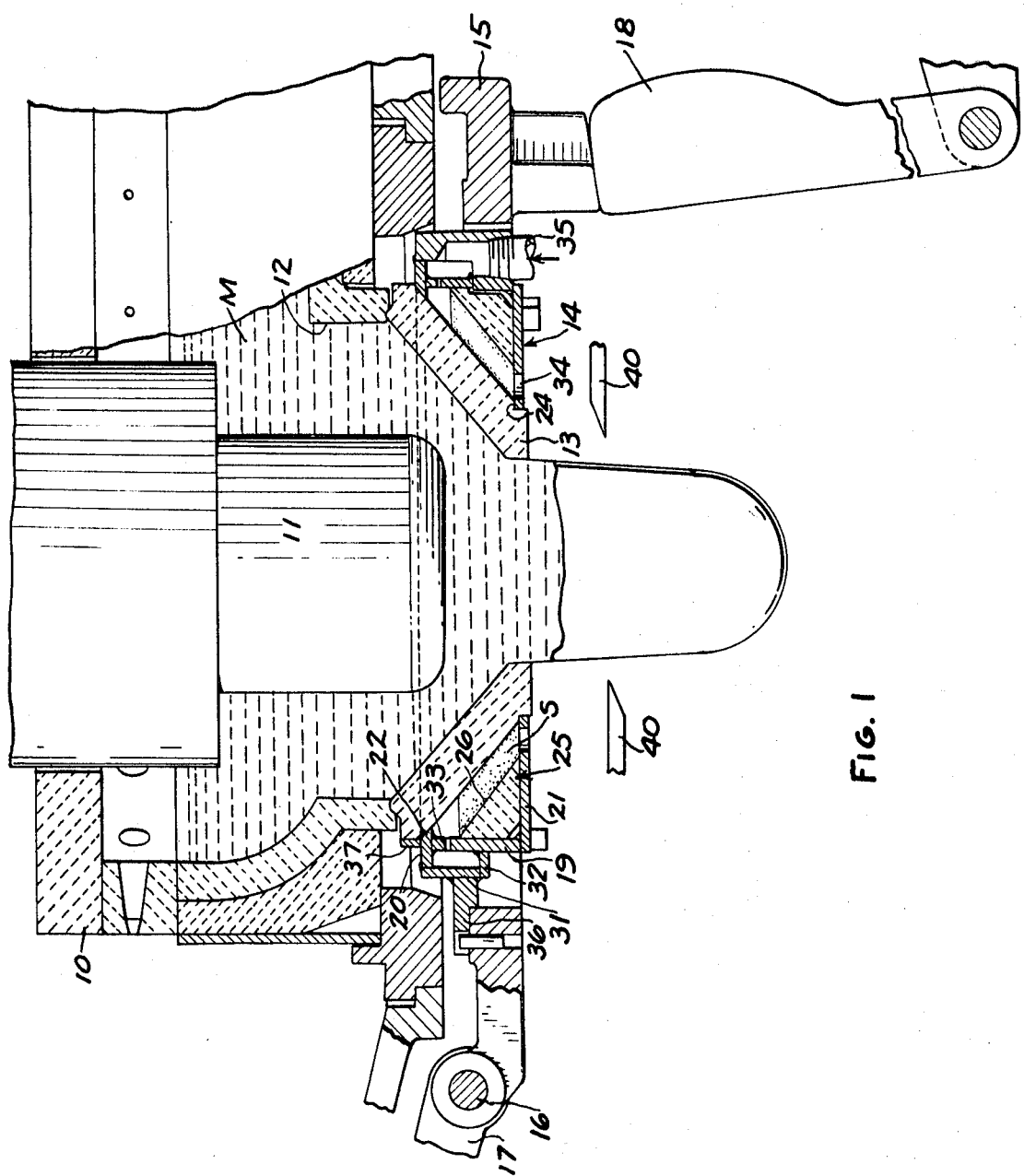

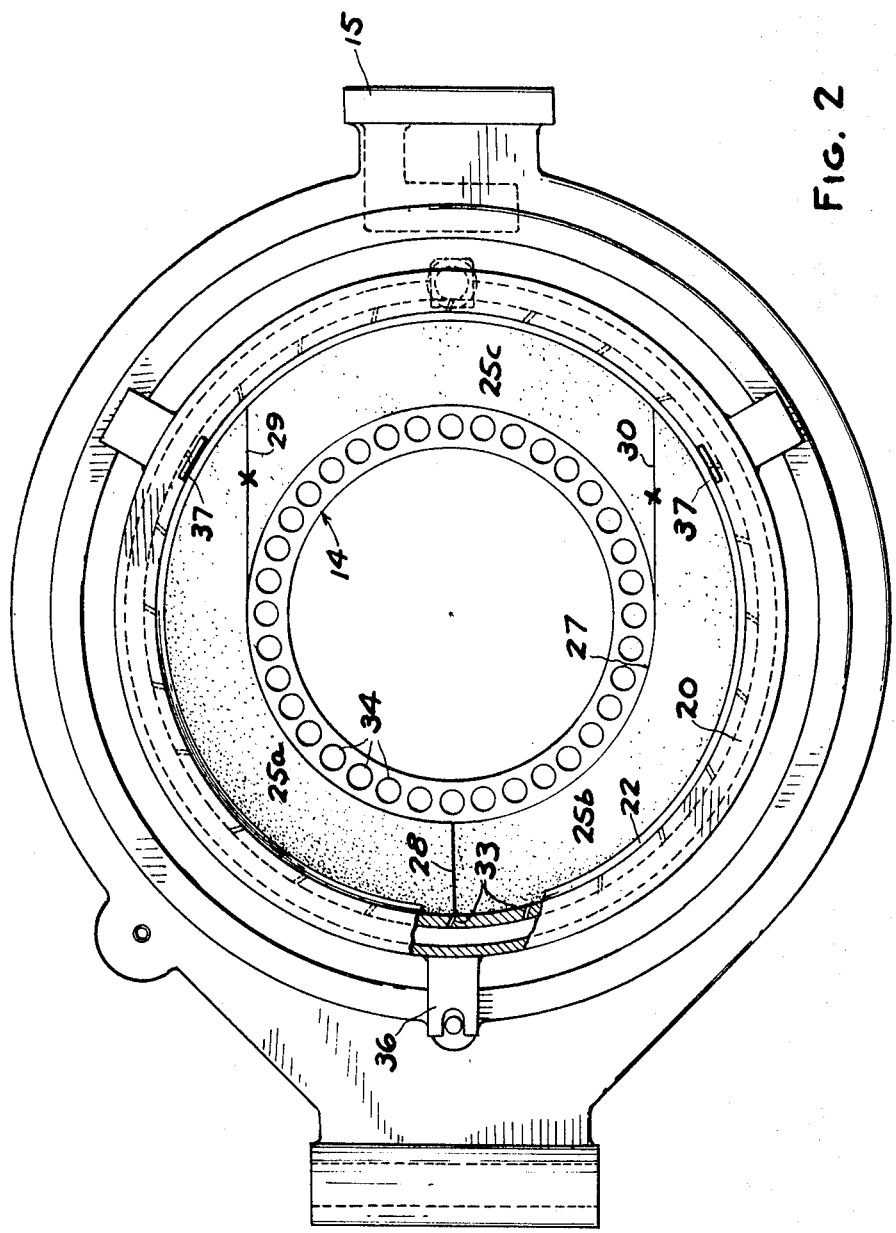

3,580,713
APPARATUS FOR FEEDING GLASS
Helmut T. Schirm, Toledo, and Robert O. Zeigler, Holland, Ohio, assignors to Owens-Illinois, Inc.
Filed Nov. 29, 1968, Ser. No. 779,705
Int. Cl. C03b 7/00
U.S. Cl. 65—327                                18 Claims

ABSTRACT OF THE DISCLOSURE

An apparatus for feeding glass comprising a forehearth having an orifice. A refractory orifice ring is supported beneath the orifice by a holder assembly which in turn is supported by a ring support. The holder assembly includes a burner which directs flames against the outer periphery of the orifice ring.

---

This invention relates to the feeding of molten glass and particularly to the supporting and heating of the orifice ring which surrounds the opening through which charges of molten glass are fed from a molten mass of glass.

In an apparatus for feeding charges of molten glass from a molten mass, it is conventional to periodically force a portion of the glass through an opening or orifice and to sever the charge from the mass. Where a large charge is being delivered, it is important to keep the charge at proper temperature condition in order to prevent devitrification. It has heretofore been suggested that this can be achieved by applying heat to the ring that surrounds the orifice through which the glass is delivered.

In such previous constructions, the orifice ring is usually supported on a support by a packed insulation. When the ring cracks as may often occur, the process of replacement becomes both a time consuming and costly one.

The problem of proper support and heating of the orifice ring is made more complex where the size of the orifice is large, that is, where the size of the charge of glass being delivered is large.

Among the objects of the invention are to provide a structure wherein the orifice ring is maintained hot to prevent devitrification, wherein packed in insulation is eliminated, and wherein suitable mechanical support is provided for the orifice ring which minimizes cracking and prevents spreading of the cracking in the event of cracking of the orifice ring.

SUMMARY

In accordance with the invention a refractory orifice ring is supported beneath the opening by a holder assembly which in turn is supported by a ring support. The holder assembly includes a burner which directs flames tangentially against the outer periphery of the orifice ring.

DESCRIPTION OF THE DRAWINGS

FIG. 1 is a part sectional vertical elevational view through an apparatus embodying the invention.

FIG. 2 is a plan view of a portion of the apparatus as shown in FIG. 1, parts being removed and parts being shown in section.

DESCRIPTION

Referring to FIGS. 1 and 2 the apparatus is shown as provided on the end of a forehearth 10 of conventional construction which includes a feeder element 11 that is periodically actuated to force a charge of glass from the molten mass M through an orifice or opening 12. A refractory frustoconical orifice ring 13 is supported beneath the opening 12 by a metal support assembly 14 which in turn is supported by a support ring 15. The support ring 15 is pivoted by a pin 16 to a bracket 17 and is held in position by a pivoted latch lever 18.

In accordance with the invention the ring support assembly 14 includes a peripheral wall 19, a top wall 20 and a horizontal bottom wall 21. The top and bottom walls 20, 21 extend radially inwardly to define openings. The inner end of the top wall 20 and the outer surface of the orifice ring 13 have complementary interengaging downwardly and inwardly inclined surfaces 22, 23 which support the upper end of the orifice ring 13.

The lower end of the orifice ring 13 is formed with an annular shoulder 24 that engages the upper surface of the inner end of the bottom wall 21 to support the lower end of the orifice ring 13.

A segmented metal insert 25 is positioned at the area of juncture of the inner surface of the peripheral wall 19 and the upper surface of the wall 21 and has a downwardly and inwardly inclined surface 26 thereby defining a space S between the surface 26 and the outer surface of the orifice ring 13.

As shown in FIG. 2 the insert 25 comprises three metallic segments or sections 25a, 25b and 25c. The joint 28 between sections 25a and 25b lies along a radial plane while the joints 29, 30 between sections 25a and 25c on the one hand and 25b and 25c on the other lie along a plane tangential to the inner periphery 27 of the insert 25. The insert 25 is preferably welded at one of the joints 28, 29 or 30.

The top wall 20 extends radially outwardly and annular walls 31, 32 cooperate therewith to define a manifold surrounding the upper end of the peripheral wall 19. Peripheral wall 19 includes a plurality of openings 33 which have their axes extending generally tangentially to the outer periphery of the orifice ring 13. The bottom wall 21 has a plurality of circumferentially spaced downwardly extending openings 34 of substantially greater diameter than openings 33. An inlet 35 is provided to the manifold.

Circumferentially spaced radial tabs 36 support the assembly 14 on the support 15. The orifice ring 13 is located laterally by circumferentially spaced vertical tabs 37.

In operation, the mixture of fuel and air is supplied through inlet 35 and passes through openings 33 to the space S where combustion takes place directing flames tangentially against the orifice ring 13 thereby heating the orifice ring 13. The gases of combustion are exhausted downwardly through the openings 34.

Each charge of glass that is fed is severed by shears 40 in accordance with conventional practice.

The orifice ring 13 is thus mechanically supported by the assembly 14 without packed in insulation tending to minimize cracking. In the event of cracking of the orifice ring 13 in use, the structure tends to support the cracked ring preventing the cracking from spreading.

We claim:
1. In an apparatus for feeding glass, the combination comprising
   means for retaining a molten body of glass and having a downwardly extending opening therein,
   an orifice ring support mounted beneath said opening,
   an orifice ring holder assembly mounted on said support,
   said orifice ring holder assembly including an annular burner assembly comprising a peripheral wall surrounding said opening,
   said peripheral wall having circumferentially spaced, generally radially inwardly extending openings therein,
   an annular manifold surrounding said wall in the area of said openings, said manifold having an inlet for providing a mixture of fuel and air, said burner assembly having a top wall extending radially inwardly and defining an opening surrounding the opening in said first-mentioned glass retaining means, said burner assembly having a bottom wall extending radially inwardly and defining another opening axially aligned with the opening defined by the top wall.

said bottom wall having a plurality of circumferentially spaced openings therein, a refractory orifice ring having portions thereof engaging said top and bottom walls and supported by said top and bottom walls, an annular insert supported by said bottom wall and positioned substantially at the area of juncture of said peripheral wall and bottom wall to define a space between said orifice ring and said insert, such that the mixture of fuel and air passes through said openings in said peripheral wall and is burned in the area between said orifice ring and said insert directing flames against said orifice ring and the gases of combustion pass outwardly through said openings in said bottom wall.

2. The combination set forth in claim 1 wherein said orifice ring includes an annular shoulder adjacent the lower end thereof engaging the inner periphery of the bottom wall.

3. The combination set forth in claim 1 wherein said top wall and said orifice ring include generally downwardly and inwardly inclined interengaging annular surfaces thereby supporting the upper end of said orifice ring.

4. The combination set forth in claim 1 wherein said insert comprises a plurality of sections defining the annulus of the insert.

5. The combination set forth in claim 4 wherein the joint between two of said sections lies in a radial plane.

6. The combination set forth in claim 5 wherein the joint which is between the other ends of said two sections and the remaining sections of said insert lie along a tangent to the inner periphery of the annulus defined by the insert.

7. The combination set forth in claim 1 including circumferentially spaced outwardly extending projections on said burner holder assembly engaging said support.

8. The combination set forth in claim 1 including generally vertically extending projections from said top wall engaging and laterally locating said orifice ring.

9. The combination set forth in claim 1 wherein said holes in said peripheral wall have their axes generally tangential to the outer periphery of the orifice ring.

10. In an apparatus for feeding glass, the combination comprising an orifice ring support adapted to be mounted beneath an opening of a glass body, an orifice ring holder assembly adapted to be mounted on said support, said orifice ring holder assembly including an annular burner comprising a peripheral wall, said peripheral wall having circumferentially spaced generally radially inwardly extending openings therein, an annular manifold surrounding said wall in the area of said openings, said manifold having an inlet for providing a mixture of fuel and air, said burner having a top wall extending radially inwardly and defining an opening, said burner assembly having a bottom wall extending radially inwardly and defining another opening axially aligned with the opening defined by the top wall, said bottom wall having a plurality of circumferentially spaced openings therein, a refractory orifice ring having portions thereof engaging said top and bottom walls and supported by said top and bottom walls, and an annular insert supported by said bottom wall and positioned substantially at the area of juncture of said peripheral wall and bottom wall to define a space between said orifice ring and said insert, such that the mixture of fuel and air passes through said openings in said peripheral wall and is burned in the area between said orifice ring and said insert directing flames against said orifice ring and the gases of combustion pass outwardly through said openings in said bottom wall.

11. The combination set forth in claim 10 wherein said orifice ring includes an annular shoulder adjacent the lower end thereof engaging the inner periphery of the bottom wall.

12. The combination set forth in claim 10 wherein said top wall and said orifice ring include generally downwardly and inwardly inclined interengaging annular surfaces thereby supporting the upper end of said orifice ring.

13. The combination set forth in claim 10 wherein said insert comprises a plurality of sections defining the annulus of the insert.

14. The combination set forth in claim 13 wherein the joint between two of said sections lies in a radial plane.

15. The combination set forth in claim 14 wherein the joint which is between the other ends of said two sections and the remaining sections of said insert lie along a tangent to the inner periphery of the annulus defined by the insert.

16. The combination set forth in claim 10 including circumferentially spaced outwardly extending projections on said burner holder assembly engaging said support.

17. The combination set forth in claim 10 including generally vertically extending projections from said top wall engaging and laterally locating said orifice ring.

18. The combination set forth in claim 10 wherein said holes in said peripheral wall have their axes generally tangential to the outer periphery of the orifice ring.

References Cited

UNITED STATES PATENTS

| | | | |
|---|---|---|---|
| 1,401,922 | 12/1921 | Peiler | 65—327X |
| 2,340,729 | 2/1944 | Barker, Jr. | 65—327X |

ARTHUR D. KELLOGG, Primary Examiner

U.S. Cl. X.R.

65—16, 356